US012573569B2

(12) United States Patent
Rudolf et al.

(10) Patent No.: US 12,573,569 B2
(45) Date of Patent: Mar. 10, 2026

(54) VEHICLE DOOR SWITCH ACTUATING APPARATUS WITH A LARGE ACTUATING SURFACE

(71) Applicant: Illinois Tool Works Inc., Glenview, IL (US)

(72) Inventors: Andreas Rudolf, Eibelstadt (DE); Zsolt Wilke, Bad Mergentheim (DE)

(73) Assignee: Illinois Tool Works Inc., Glenview, IL (US)

( * ) Notice: Subject to any disclaimer, the term of this patent is extended or adjusted under 35 U.S.C. 154(b) by 206 days.

(21) Appl. No.: 18/230,944

(22) Filed: Aug. 7, 2023

(65) Prior Publication Data

US 2024/0062973 A1      Feb. 22, 2024

(30) Foreign Application Priority Data

Aug. 19, 2022    (DE) ..................... 10 2022 121 032.4

(51) Int. Cl.
| | |
|---|---|
| *H01H 23/00* | (2006.01) |
| *B60R 16/00* | (2006.01) |
| *H01H 21/22* | (2006.01) |

(52) U.S. Cl.
CPC ......... *H01H 23/003* (2013.01); *B60R 16/005* (2013.01); *H01H 2021/225* (2013.01)

(58) Field of Classification Search
CPC .. H01H 23/003; H01H 2021/225; H01H 3/00; H01H 3/02; H01H 3/04; H01H 3/06;
(Continued)

(56) References Cited

U.S. PATENT DOCUMENTS

| | | |
|---|---|---|
| 4,867,501 A | 9/1989 | Nomura et al. |
| 7,062,945 B2 | 6/2006 | Saitoh et al. |
| | (Continued) | |

FOREIGN PATENT DOCUMENTS

| | | |
|---|---|---|
| DE | 102013212083 A1 | 1/2014 |
| DE | 102016112423 A1 | 1/2017 |
| | (Continued) | |

*Primary Examiner* — Anthony R Jimenez
(74) *Attorney, Agent, or Firm* — McAndrews, Held & Malloy, Ltd.

(57) ABSTRACT

The present disclosure relates to a vehicle door switch actuating apparatus (100). The apparatus includes an actuating element (104) having an actuating surface (110), a mechanical switch (112), and a mechanism for transferring a compressive force applied by a user to the actuating surface (110) onto the mechanical switch (112) in order to flip the mechanical switch (112). The mechanism includes: a first component (102) on which the mechanical switch (112) is fixed at least in the switching direction; and a lever (120) pivotally supported about a pivot axis (124) relative to the first component (102) or the first component group and connected to the actuating element (104) via a first bearing on a first side (111) of the actuating surface (110). The actuating element (104) is supported on the first component (102) or the first component group via a second bearing on a second side (113) of the actuating surface (110). The actuating element (104) is flexibly configured such that, when manual pressure is applied to the actuating surface (110), it flexibly bends, thereby causing a change in the distance between the first bearing and the second bearing, in particular a shortening or lengthening of the distance, and thus causes the lever to pivot about the pivot axis (124). The mechanical switch (112) is arranged such that, by pivoting the lever, the mechanical switch (112) is flipped. The lever (120) extends substantially parallel to the first side (111) of the actuating surface (110).

19 Claims, 7 Drawing Sheets

(58) Field of Classification Search
CPC .. H01H 3/12; H01H 3/32; H01H 3/46; H01H
13/20; H01H 13/50; H01H 13/52; H01H
21/22; H01H 21/24; H01H 21/36; H01H
23/16; H01H 25/00; H01H 25/006; H01H
2003/00; H01H 2003/02; H01H
2003/028; H01H 2003/00293; H01H
2003/12; H01H 2009/02; H01H
2009/0285; H01H 2009/06; H01H
2013/00; H01H 2013/04; H01H 2013/50;
H01H 2221/00; H01H 2221/016; H01H
2231/026; H01H 23/00; B60R 16/00
USPC .......................................................... 200/329
See application file for complete search history.

(56) References Cited

U.S. PATENT DOCUMENTS

| | | | |
|---|---|---|---|
| 9,156,335 B1 | 10/2015 | Harter et al. | |
| D806,513 S | 1/2018 | Curic et al. | |
| 10,053,893 B1 | 8/2018 | Patel et al. | |
| 10,934,748 B2 | 3/2021 | Harajli et al. | |
| 10,941,603 B2 | 3/2021 | Linden et al. | |
| 11,027,646 B2 | 6/2021 | Kothe et al. | |
| 11,180,943 B2* | 11/2021 | Khan ...................... | E05F 15/42 |
| 11,814,891 B2* | 11/2023 | Cumbo ................. | E05F 15/622 |
| 2014/0367975 A1* | 12/2014 | Sanborn ............... | H03K 17/962 |
| | | | 292/336.3 |

FOREIGN PATENT DOCUMENTS

| | | | |
|---|---|---|---|
| DE | 202017104635 U1 | 10/2017 | |
| DE | 102016109933 A1 | 11/2017 | |
| DE | 202019103205 U1 | 7/2019 | |
| DE | 102019206282 A1 | 11/2020 | |
| DE | 102020113492 A1 | 11/2021 | |
| DE | 102022105502 A1 | 9/2022 | |
| EP | 1944436 A2 | 7/2008 | |
| EP | 3122967 A1 | 2/2017 | |
| EP | 3322870 B1 | 5/2018 | |
| EP | 3734002 A1 | 11/2020 | |
| EP | 3430217 B1 | 1/2022 | |
| EP | 4258312 A2 | 10/2023 | |
| FR | 3096713 A1 | 12/2020 | |
| WO | 2015144526 | 1/2015 | |

* cited by examiner

100

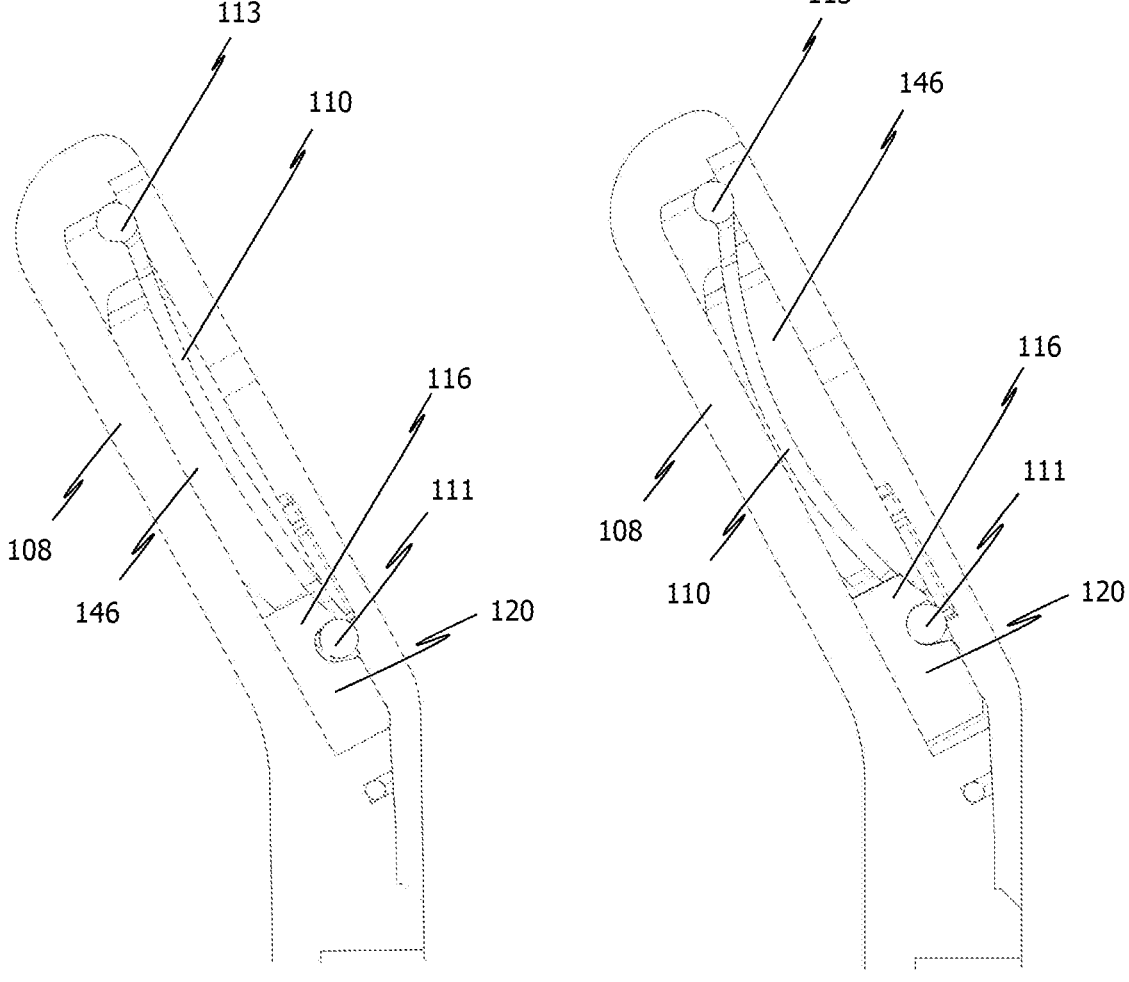
*FIG. 6A*                        *FIG. 6B*

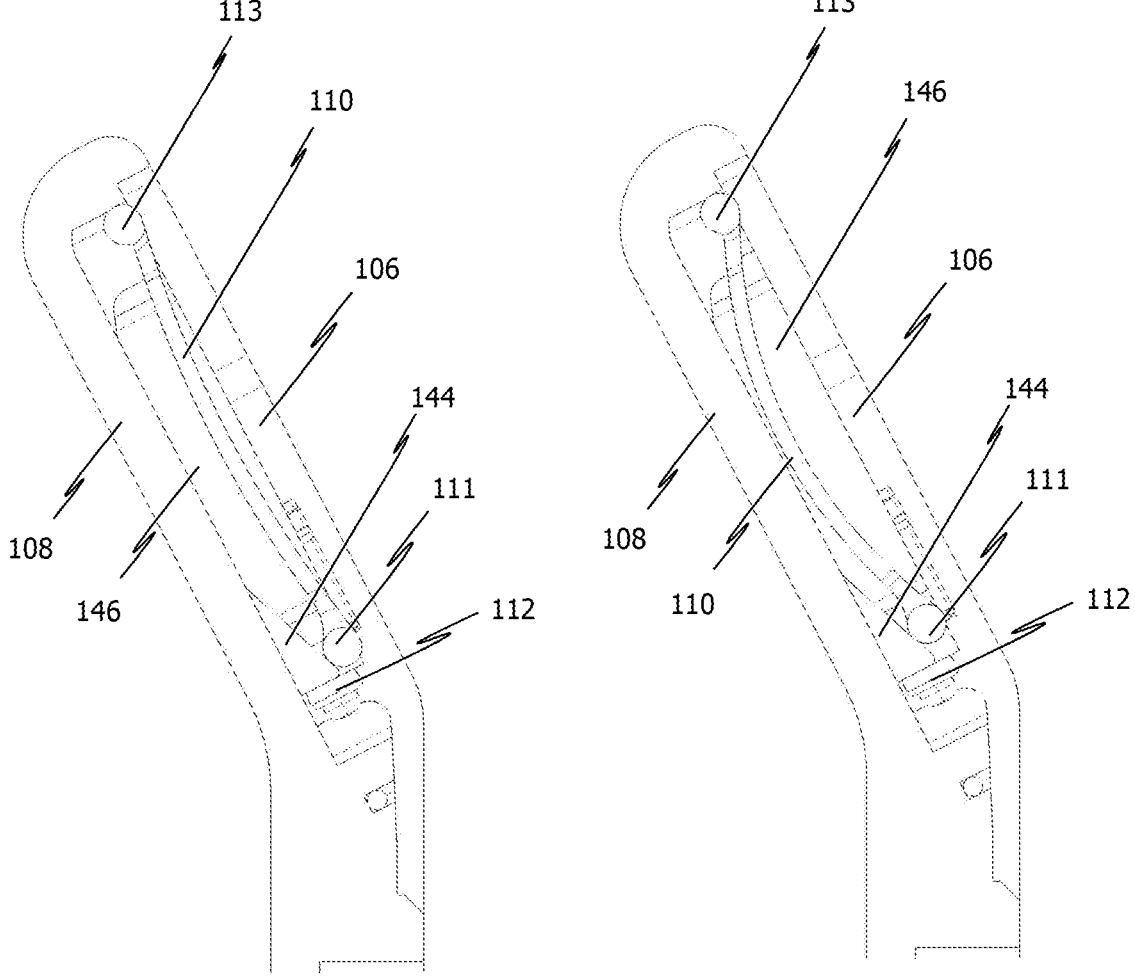
FIG. 7A                              FIG. 7B

VEHICLE DOOR SWITCH ACTUATING APPARATUS WITH A LARGE ACTUATING SURFACE

RELATED APPLICATION

The present application claims the benefit of German Patent Application No. DE 10 2022 121 032.4, filed Aug. 19, 2022, the contents of which are hereby incorporated by reference.

BACKGROUND

The prior art according to WO 2016/077068A1 discloses such a vehicle door switch apparatus for a microswitch, in particular, wherein it is noteworthy that the possible actuating surface on which a user can push to actuate the switch is very large relative to the size of the switch, but a good pressure point is nevertheless provided at each point of the surface.

In order to improve the prior art according to WO 2016/077068A1, in DE 10 2017 124 368B4, an easily produced vehicle door switch actuating apparatus is provided, in which the switch is also actuatable via a large surface region. A further advantage according to DE 10 2017 124 368B4 is that only a small amount of space is required below the actuating surface. Although the solution according to DE '368 B4 saves installation space below the actuating surface, a relatively large installation depth within the vehicle frame is still necessary for such a vehicle door switch actuating apparatus. Based on the situation as described above, the problem addressed by the present disclosure is to provide a vehicle door switch actuating apparatus that implements the advantages of the solution shown in DE 368 B4 in the smallest possible design space.

SUMMARY

The present disclosure relates to a switch actuating apparatus, substantially as illustrated by and described in connection with at least one of the figures, as set forth more completely in the claims. More specifically, the present disclosure relates to a switch actuating apparatus for vehicle doors. According to a further aspect, the present disclosure relates to a door handle module and a vehicle door having the vehicle door switch actuating apparatus.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

FIG. 6A illustrates a cross-section through the embodiment shown in FIG. 1 in the resting state of the lever.

FIG. 6B illustrates a cross-section through the embodiment shown in FIG. 1 in a first actuation state of the lever.

FIG. 7A illustrates a schematic cross-section through the first embodiment according to FIG. 1 without the lever in the resting state.

FIG. 7B illustrates a cross-section according to FIG. 7A in the first actuation state of the apparatus.

DETAILED DESCRIPTION

Figure 1:
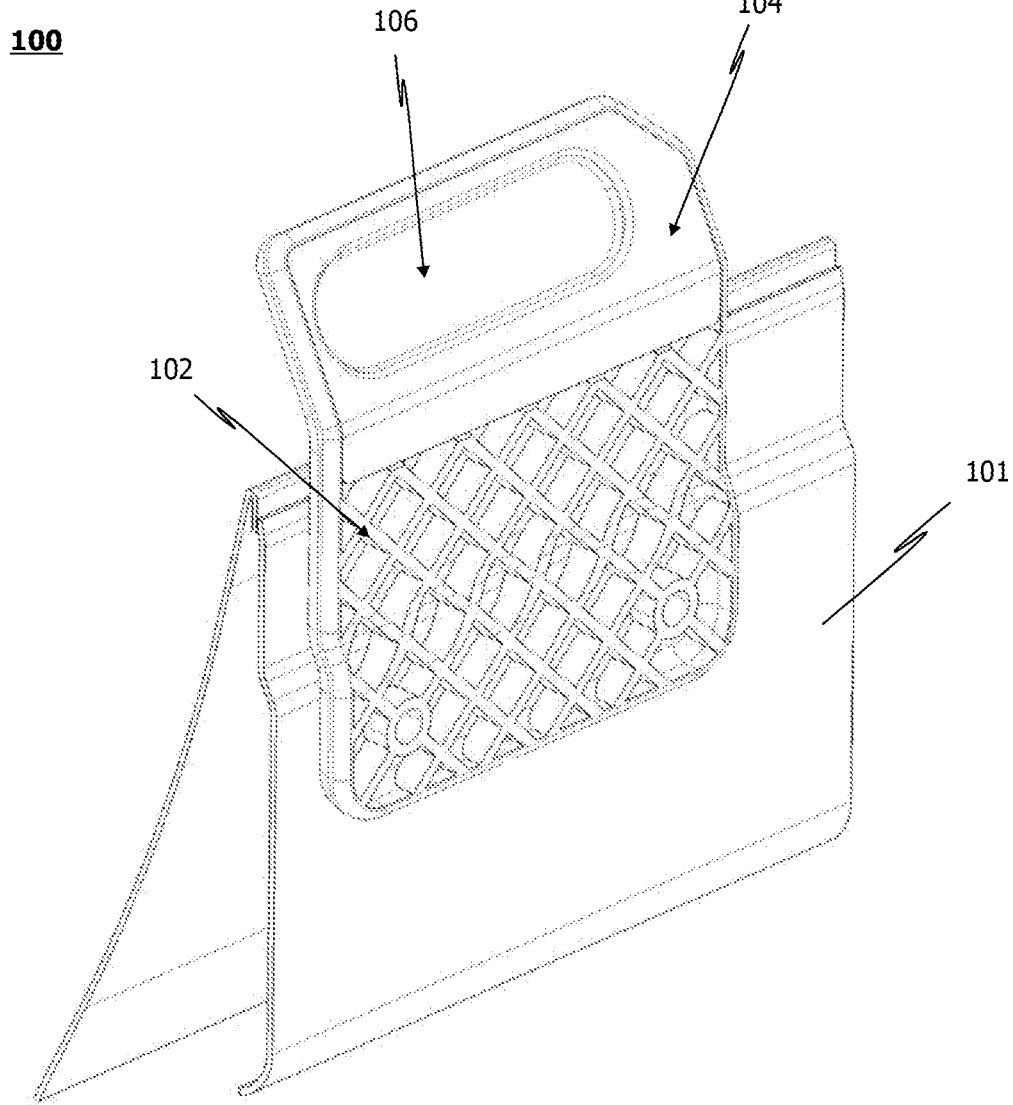
FIG. 1 illustrates a perspective view of a vehicle door switch actuating apparatus according to an embodiment of the present disclosure.

In particular, the present disclosure relates to a vehicle door switch actuating apparatus, wherein the apparatus comprises an actuating element having an actuating surface, a mechanical switch, and a mechanism for transferring a compressive force applied by a user to the actuating surface onto the switch in order to flip the switch, wherein the mechanism comprises the following: a first component or a first component group on which the switch is fixed at least in the switching direction; and a lever pivotally supported about a pivot axis relative to the first component or the first component group and connected to the actuating element via a first bearing on a first side of the actuating surface, wherein the actuating element is supported on the first component or the first component group via a second bearing on a second side of the actuating surface, wherein the actuating element is flexibly configured such that, when manual pressure is applied to the actuating surface, it flexibly bends, thereby causing a change in the distance between the first bearing and the second bearing, in particular a shortening or lengthening of the distance, and thus causes the lever to pivot about the pivot axis, and wherein the switch is arranged such that, by pivoting the lever, the switch is flipped, wherein the lever extends substantially parallel to the first side of the actuating surface.

By arranging the lever parallel to the first side of the actuating surface, the lever can extend in particular along the longitudinal direction of the actuating surface and thus utilizes the same design space as the actuating surface itself. In other words, in order to achieve a large actuating surface and to save design space, the latter can extend parallel to the vehicle exterior. According to the present disclosure, the lever also extends in the same direction so that the required design space can be significantly reduced.

According to a further embodiment, the lever comprises a first region configured so as to contact the switch and a second region, in particular with a first hook, wherein the second region is connected to the first side of the actuating element and is arranged between the first region and the pivot axis. In other words, the lever is connected to the actuating surface between the pivot axis and the contact region with the switch. This can preferably cause the switch to be pressed reliably via a single connection region between the actuating surface and the lever, even if pressure is applied at the far ends of the actuating surface.

According to a further embodiment, the lever comprises a third region, in particular with a second hook, wherein the third region is connected to the first side of the actuating element, and wherein the third region is arranged between the first and second region. Accordingly, the third region provides a second operative connection between the lever and the actuating surface. The actuation of the actuating surface can thereby be transferred even more reliably to the lever and thus to the switch, because the force input by the user can now be transferred to the lever not only via the second region but also via the third region.

According to a further embodiment, the lever has a resting position in which the switch is not switched, wherein the lever is biased into its resting position.

The vehicle door switch actuating apparatus comprises a spring, in particular a wire spring, which biases the lever into its resting position and is connected to a fourth region of the lever, and wherein the pivot axis is arranged between the first and fourth region. The spring can be arranged at an end of the lever opposite the first region. A setting of the biasing force can thereby be adjusted very simply not only via the spring constant, but also via the lever length between the pivot axis and the first region as well as the pivot axis and the fourth region.

According to a further embodiment, the spring is oriented substantially parallel to the lever. Thus, the required installation space of the vehicle door switch actuating apparatus according to the present disclosure can be further reduced.

According to a further embodiment, the actuating surface on its first side comprises at least one opening for connection with the lever. A part, in particular a hook, of the lever on the second (or third) region can engage with the actuating surface via the at least one opening. This enables a particularly simple and reliable transfer of the movement of the actuating surface to the lever. This also enables a quick and easy assembly of the actuating surface on the lever.

According to a further embodiment, the distance between the first and second bearing is shorter than the first and second side, respectively, and/or the first side and the second side of the actuating element (104) lie opposite one another and (the side ends/side edges) preferably extend substantially parallel to one another, wherein the actuating element (104) has a third (and preferably fourth) side that extend(s) approximately transverse to the first and second side, wherein the third (and preferably fourth) side is/are shorter than the first and second side, respectively. According to this embodiment, the apparatus is particularly compact, however with a long lever effect and a large usable operating surface.

According to a further aspect, the present disclosure relates to a door handle module having the aforementioned vehicle door switch actuating apparatus.

According to a further aspect, the present disclosure relates to a vehicle door, wherein the vehicle door comprises one of the aforementioned vehicle door switch actuating apparatuses or a door handle module.

According to a further embodiment, the vehicle door and/or the door handle module and/or the vehicle door switch actuating apparatus form a handle region having a longitudinal direction for coming into contact with a plurality of fingers of a user along the longitudinal direction, wherein the expansion of the handle region is at least two centimeters in the longitudinal direction, wherein the actuating surface forms a face of the handle region and is arranged over at least 50% of the handle region in the longitudinal direction. The handle region is thus equipped with an actuating surface that can be pushed via a large region.

The present disclosure will now be described in further detail on the basis of the exemplary embodiments shown in the figures.

FIG. 1 shows an embodiment of the vehicle door switch actuating apparatus 100 in the installed state, that is to say, the vehicle door switch actuating apparatus 100 according to FIG. 1 is exemplary connected to an inner panel 101 of a chassis. In particular, the inner panel 101 can be an inner panel of a vehicle door to which the vehicle door switch actuating apparatus 100 is releasably or unreleasably connected.

The vehicle door switch actuating apparatus comprises a first component 102, which can also be described as a support element of the vehicle door switch actuating apparatus 100. An actuating element 104 is attached to the first component 102. Only a cover of the actuating element 104 can be seen in FIG. 1. The cover has a rigid region 105 as well as an elastic region 106. The elastic region 106 allows the user to actuate the vehicle door switch actuating apparatus 100. In particular, the user can push on the elastic region 106 with his or her fingers in order to move the actuating surface 110 shown in FIG. 3.

Figure 2:
FIG. 2 illustrates a frontal view of the apparatus shown in FIG. 1.
Figure 2:
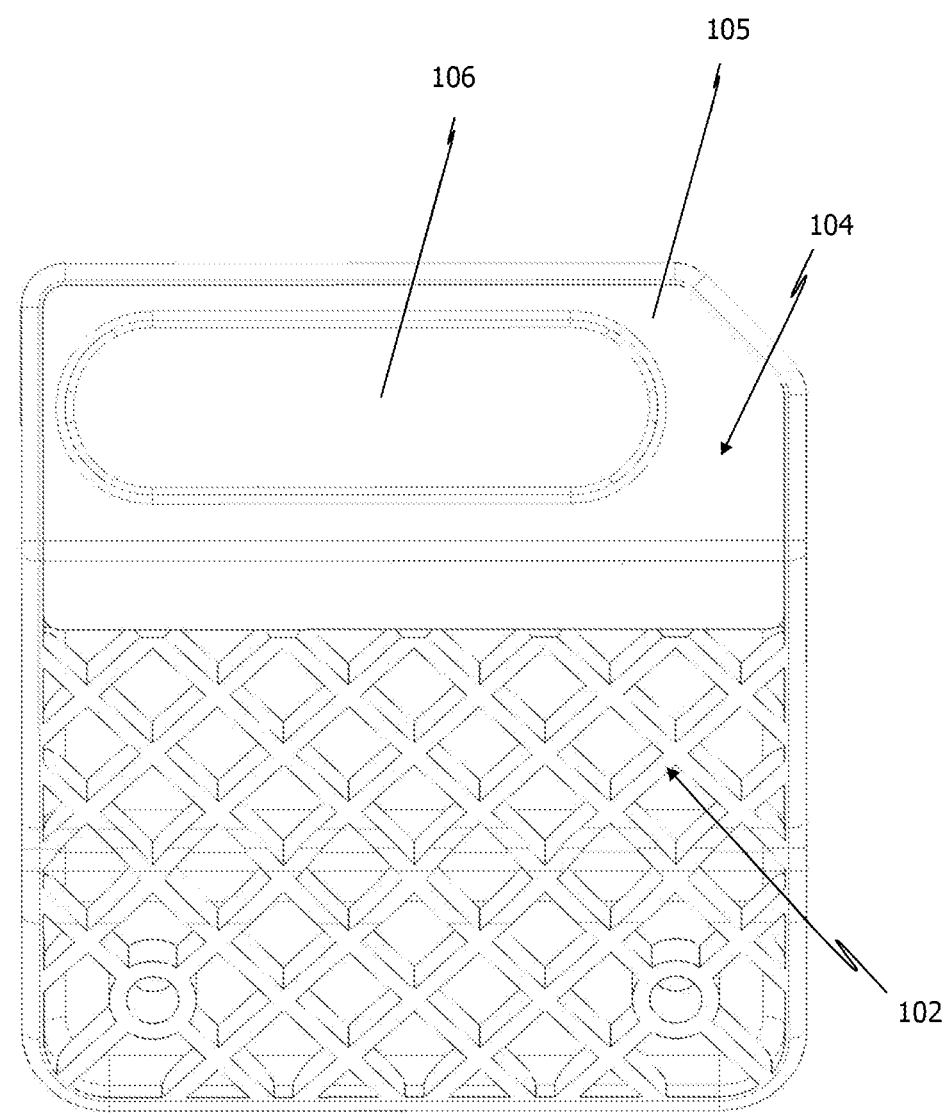
Figure 3:
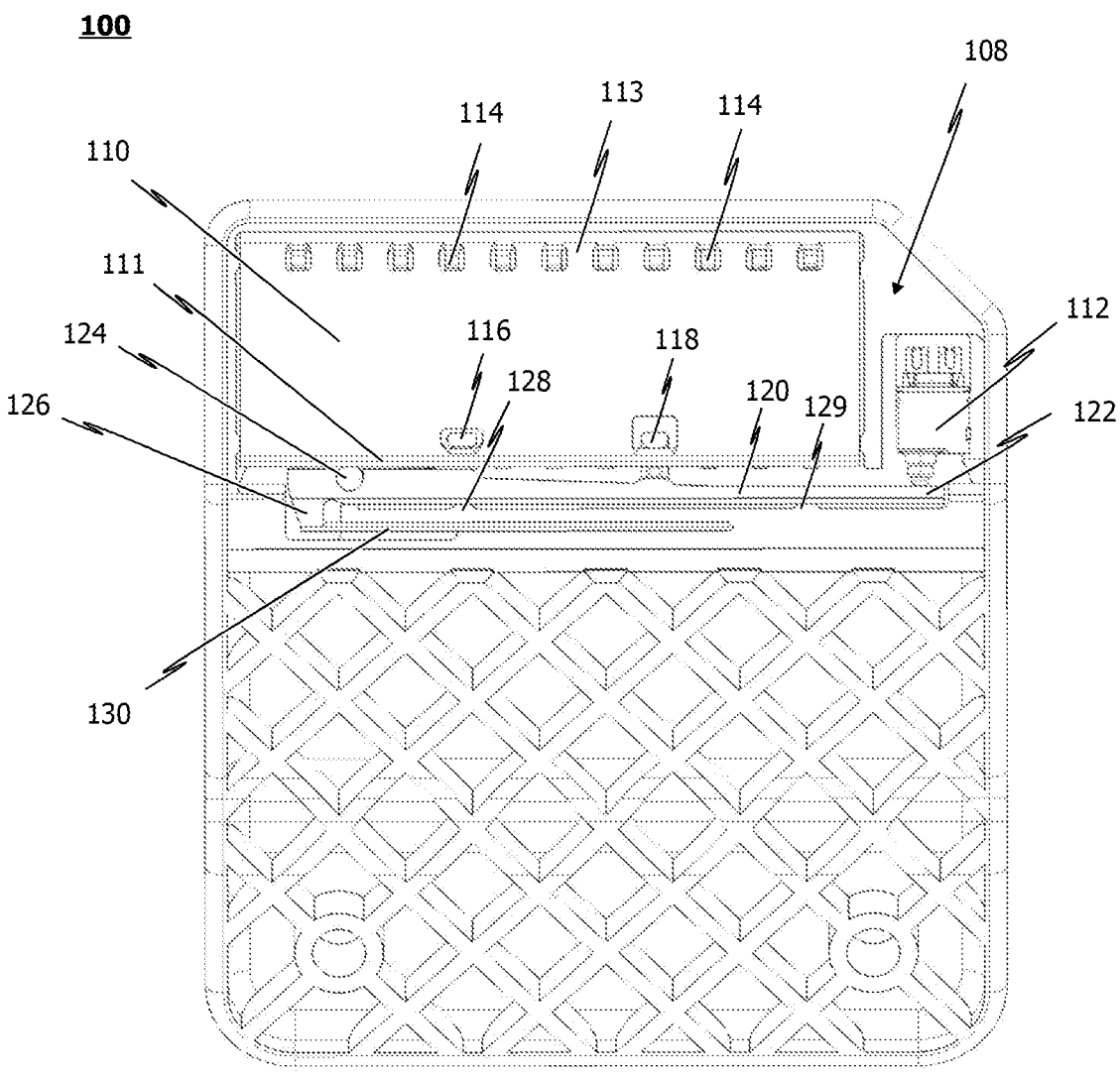
FIG. 3 illustrates a frontal view of the apparatus shown in FIG. 1 without a cover in the resting state of the lever.

FIG. 3 shows a frontal view according to FIG. 2, wherein the cover of the actuating element 104 has been removed in order to show the underlying components. The first component 102 has a cavity covered by the cover, which cavity comprises the actuating surface 110, a mechanical switch 112, and a mechanism for transferring a compressive force applied by a free user to the actuating surface 110 onto the switch 112.

The flexibly designed actuating surface 110 has a first side 111 and an opposing second side 113. The first and second sides 111, 113 extend along the longitudinal direction of the substantially rectangularly configured actuating surface 110. The actuating surface 110 is connected to a lever 120 via a first bearing on its first side 111. The lever 120 serves in order to flip a switch 112, for example a microswitch, when a compressive force is applied to the actuating surface 110. On the opposite second side 113, the actuating surface 110 is supported on the first component 102. In particular, the actuating surface 110 on its second side 113 has a plurality of openings configured so as to receive corresponding bearing hooks 114 of the first component 102. The actuating surface 110 can be pivoted about the bearing hooks 114, in particular, as will be explained in further detail in relation to FIGS. 6A to 7B. The bearing hooks 114 accordingly form a second bearing.

The lever 120 has a first region 122 configured so as to contact the switch. In the resting position of the lever 120 shown in FIG. 3, the first region 122 is shown in contact with the mechanical switch 112. However, while in the resting state, the lever 120 does not activate the switch 112. In other embodiments, the first region 122 can also be spaced apart from the switch 112 when the lever 120 is in the resting state.

The lever 120 is pivotable relative to a pivot axis 124. The lever 120 is biased into the resting position, shown in FIG. 3. For example, the lever can have a fourth region 126 connected to a spring 130, which biases the lever 120 into the resting position. The fourth region 126 is arranged at an end opposite the first region 122 of the lever 120. In other words, the pivot axis 124 is located between the first region 122 and the fourth region 126 of the lever 120. The spring 130 formed as the wire spring biases the lever 120 in the clockwise direction, shown in FIG. 3.

In the resting position shown in FIG. 3, the lever 120 is pushed by the spring 130 onto the saddles 128, 129 of the first component 102, that is to say, it is biased towards the saddles 128, 129. The saddles 128, 129 are arranged such that the first region 122 of the lever 120 does not actuate the switch 112 when the lever 120 is in contact with the saddles 128, 129.

The lever 120 comprises a first connecting hook 116, which is configured so as to connect a second region of the lever 120 to the actuating surface 110. The first connecting hook 116 engages with a corresponding opening attached to the first side 111 of the actuating surface 110. The connecting hook and the corresponding opening of the actuating surface form the first bearing.

FIG. 3 further shows an optional second connecting hook 118 of the lever 120 configured so as to connect a third region of the lever 120 to the actuating surface 110. The second connecting hook 116 engages with a corresponding opening on the first side 111 of the actuating surface 110.

The first connecting hook 116, and thus the second region of the lever 120, is arranged between the pivot axis 124 and the first region 122 of the lever 120. The second connecting hook 118, and thus the third region of the lever 120, is arranged between the second region and the first connecting hook 116 and the first region 122, respectively. Thus, the second connecting hook 118 is also arranged between the pivot axis 124 and the first region 122 of the lever 120.

As will be explained in further detail below, the two connecting hooks 116, 118 serve to transfer a force applied to the actuating surface 110 onto the lever 120 in order to pivot it in relation to the pivot axis 124 (counterclockwise here).

Figure 4:
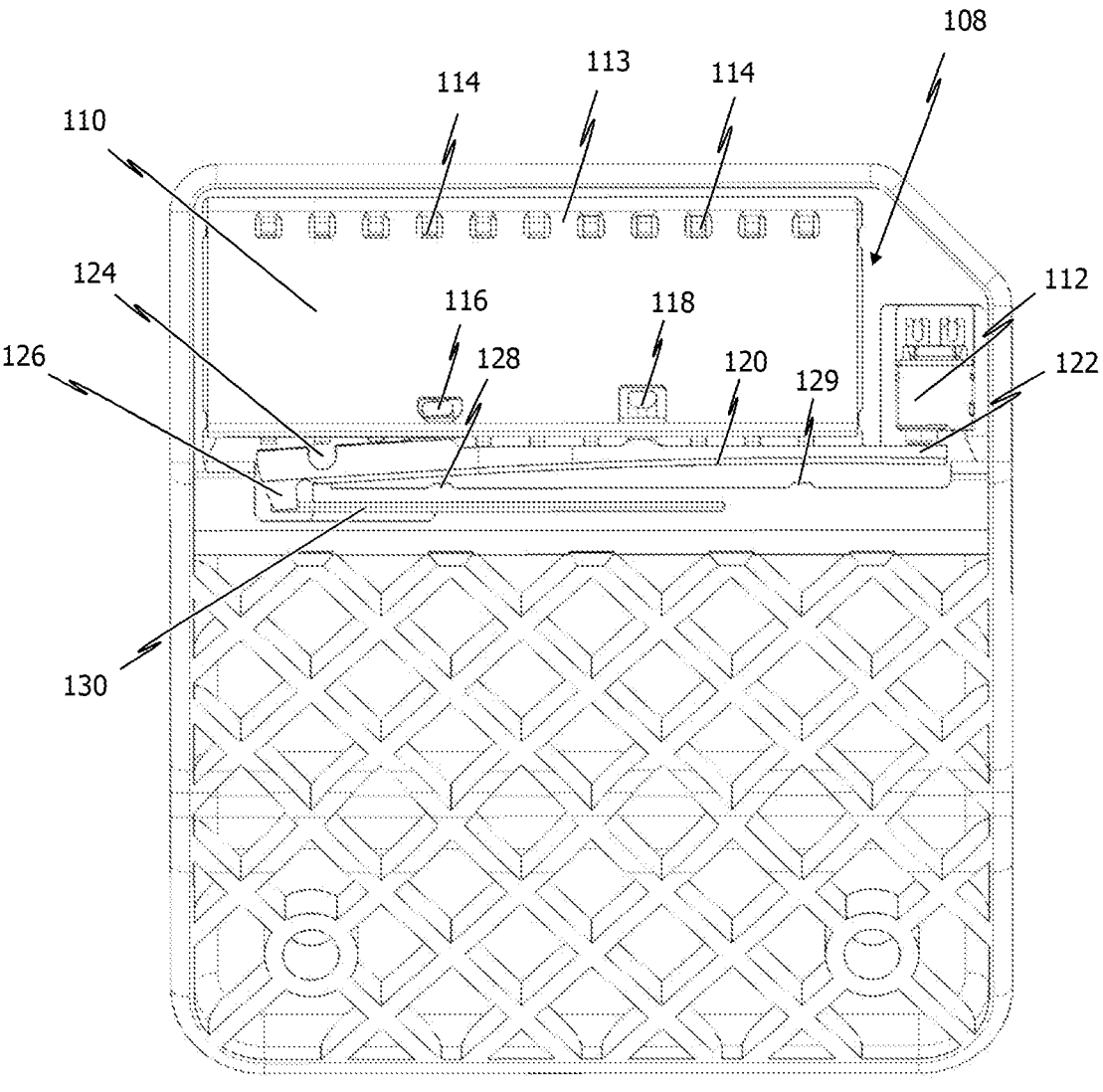
FIG. 4 illustrates a frontal view according to FIG. 3 in a first actuation state of the lever.

FIG. 4 shows a first actuation position of the lever 120. In the first actuation position according to FIG. 4, the force applied to the actuating surface 110 is transferred primarily via the first connecting hook 116 and thus via the second region onto the lever 120. This is the case, for example, when the user actuates the actuating surface 110 on the left side shown here, that is to say, to the left of the first connecting hook 116. A corresponding deformation of the actuating surface 110 is thus first transferred onto the first connecting hook 116. The first connecting hook 116 is thereby pulled towards the second end 113 of the actuating surface 110. By pulling on the first connecting hook 116, the lever 120 is pivoted (counterclockwise) away from the saddles 128, 129. Of course, this pivoting of the lever 120 occurs counter to the biasing of the spring 130.

In the first actuation position of the lever 120 shown in FIG. 4, the lever pushes against the switch 112 and flips it accordingly. In the first actuation position, by pulling on the first connecting hook 116, the lever 120 is pivoted further than necessary for mere actuation of the switch 112. In other words, the lever 120 is pivoted even further when the first region 122 cannot further push on the switch 112. For this reason, the lever 120 is at least semi-elastic, such that a further pulling on the first connecting hook 116 by activating the actuating surface 110 only results in an elastic deformation of the lever 120, but not a breakage of the lever or damage to the switch.

Figure 5:
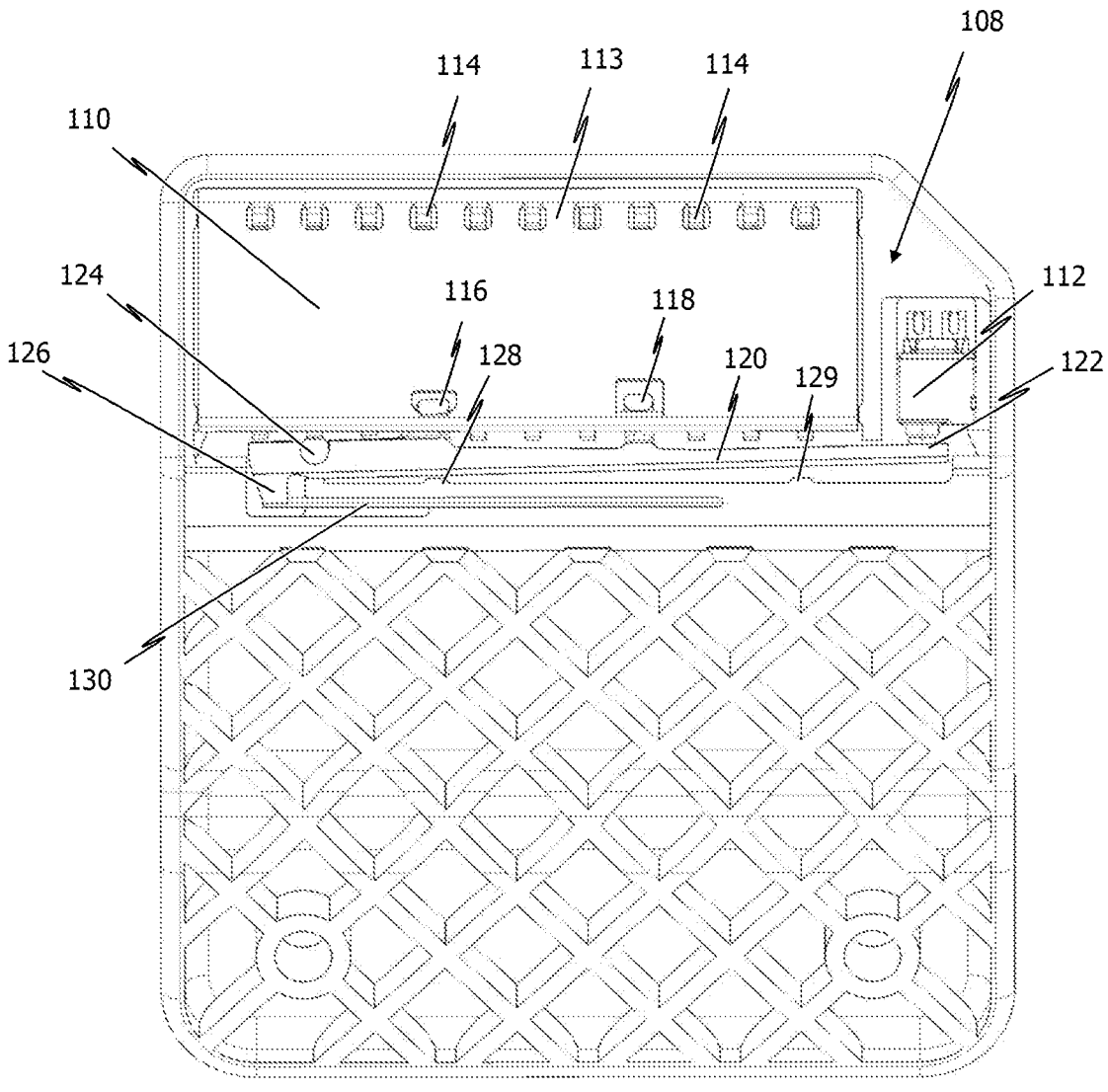
FIG. 5 illustrates a frontal view according to FIG. 3, in a second actuation state of the lever.

FIG. 5 shows a second actuation position of the lever 120. The second actuation position is achieved in particular when the force on the actuating surface 110 is transferred onto the lever 120 primarily via the second connecting hook 118. This can be the case, for example, when the actuating surface 110 is pushed in by the user at the right end of the actuating surface 110 shown here. Because the second connecting hook 118 is located closer to the first region 122 of the lever 120 than the first connecting hook 116, a pulling of the second connecting hook 118 due to the lever path results in a smaller pivoting movement of the lever 120 about the pivot axis 124. The second connecting hook 118 and the associated opening on the first side 111 of the actuating surface 110 are configured such that a pivoting of the lever 120 via the second connecting hook 118 also leads to the activation of the switch 112. However, by contrast to the first actuation position shown in FIG. 4, the lever 120 remains substantially undeformed in the second actuation position according to FIG. 5.

FIGS. 6A and 6B show a cross-sectional view of the vehicle door switch actuating apparatus 100 according to FIG. 1. In FIG. 6A, a section through the resting position shown in FIG. 3 is shown. FIG. 6B shows the first actuation position shown in FIG. 4. As indicated above, the first component 102 forms a housing 108 in which the actuating surface 110 and the lever 120 are arranged. In the resting position shown in FIG. 6A, the actuating surface 110 is supported on the housing 108 such that a cavity 146 is formed behind the actuating surface 110, which allows for a deformation of the actuating surface upon actuation by the user.

FIG. 6A shows the first side 111 of the actuating surface 110 anchored to the first connecting hook 116 of the lever 120. On the opposite second side of the actuating surface 110, the actuating surface 110 is connected to the bearing hooks 114 of the housing 108 shown in FIG. 3. The actuating surface 110 is rotatably supported on its first side 111 and on its opposite second side 113.

As can be seen in FIG. 6B, the actuating surface 110 deforms when pushed in by the user and moves into the cavity 146. As a result of this deformation, the first and second sides 111, 113 rotate in their respective bearings, and the distance between the first side 111 and the second side 113 decreases. By reducing or shortening the distance, a tensile force is exerted on the lever 120 via the first connecting hook 116. Accordingly, FIG. 6B shows the lever 120 moving towards the actuating surface 110, because it is now moved towards the switch 112 about the pivot axis 124, as is shown for example in FIG. 3.

FIGS. 7A and 7B show the same positions as in FIGS. 6A and 6B. However, the lever 120 is not shown in FIGS. 7A and 7B for ease of illustration. As can be seen, at least one guide ramp 144 is located in the cavity 146 of the housing 108. In particular, a plurality of parallel guide ramps are located in the cavity, which cannot be seen in FIGS. 7A and 7B in detail. The guide ramp(s) 144 is (are) configured so as to direct the first side 111 of the actuating surface 110 into the cavity, that is to say on the one hand towards the housing 108 and on the other hand away from the saddles 128, 129, when the actuating surface 110 is deformed by a pushing action of the user. The ramp guides 144 thus ensure that an accurate and repeatable actuation of the lever 120 is achieved.

The present disclosure is not limited to the embodiments shown in the figures, but rather results when all of the features disclosed herein are considered together.

What is claimed is:

1. A vehicle door switch actuating apparatus, wherein the apparatus comprises an actuating element having an actuating surface, a mechanical switch, and a mechanism for transferring a compressive force applied by a user to the actuating surface onto the mechanical switch in order to actuate the mechanical switch, wherein the mechanism comprises:

a first component on which the mechanical switch is fixed at least in a switching direction; and a lever pivotally supported about a pivot axis relative to the first component and connected to the actuating element via a first bearing on a first side of the actuating surface, wherein the actuating element is supported on the first component via a second bearing on a second side of the actuating surface, wherein the actuating element is flexibly configured such that, when manual pressure is applied to the actuating surface, it bends, thereby causing a change in a distance between the first bearing and the second bearing, and thus causes the lever to pivot about the pivot axis, and wherein the mechanical switch is arranged such that, by pivoting the lever, the mechanical switch is actuated, and wherein the lever extends substantially parallel to the first side of the actuating surface.

2. The vehicle door switch actuating apparatus according to claim 1, wherein the distance between the first and second bearing is shorter than the first and second side.

3. The vehicle door switch actuating apparatus according to claim 1, wherein the first side and the second side of the actuating element lie opposite one another and extend substantially parallel to one another, wherein the actuating element has a third side that extends approximately transverse to the first side and the second side, wherein the third side is shorter than the first side and the second side, respectively.

4. The vehicle door switch actuating apparatus according to claim 1, wherein the change in the distance between the first bearing and the second bearing, is a shortening or lengthening of the distance.

5. A door handle module, wherein the door handle module comprises a vehicle door switch actuating apparatus according to claim 1.

6. A vehicle door, wherein the vehicle door comprises a door handle module according to claim 5.

7. A vehicle door, wherein the vehicle door comprises a vehicle door switch actuating apparatus according to claim 1.

8. The vehicle door according to claim 7, wherein the vehicle door form a handle region having a longitudinal direction for coming into contact with a plurality of fingers of a user along the longitudinal direction, wherein expansion of the handle region is at least 2 cm in the longitudinal direction, wherein the actuating surface forms a face of the handle region and is arranged over at least 50% of the handle region in the longitudinal direction.

9. The vehicle door switch actuating apparatus according to claim 1, wherein the lever comprises a first region configured so as to contact the mechanical switch and a second region, wherein the second region is connected to the first side of the actuating element and is arranged between the first region and the pivot axis.

10. The vehicle door switch actuating apparatus according to claim 9, wherein the second region comprises a first hook.

11. The vehicle door switch actuating apparatus according to claim 2, wherein the second region has a closer distance to the pivot axis than the first region.

12. The vehicle door switch actuating apparatus according to claim 3, wherein the lever comprises a third region, wherein the third region is connected to the first side of the actuating element, and wherein the third region is arranged between the first region and the second region.

13. The vehicle door switch actuating apparatus according to claim 12, wherein the third region comprises a second hook.

14. The vehicle door switch actuating apparatus according to claim 12, wherein the actuating surface on its first side comprises at least one opening for connection to the lever.

15. The vehicle door switch actuating apparatus according to claim 8, wherein the second region or the third region comprises a hook configured so as to engage with the at least one opening of the actuating surface.

16. The vehicle door switch actuating apparatus according to claim 4, wherein the lever has a resting position in which the mechanical switch is not switched, and wherein the lever is biased into its resting position.

17. The vehicle door switch actuating apparatus according to claim 5, wherein the vehicle door switch actuating apparatus comprises a spring, which biases the lever into its resting position and is connected to a fourth region of the lever, and wherein the pivot axis is arranged between the first region and the fourth region.

18. The vehicle door switch actuating apparatus according to claim 17, wherein the spring is a wire spring.

19. The vehicle door switch actuating apparatus according to claim 6, wherein the spring is oriented substantially parallel to the lever.

\* \* \* \* \*